United States Patent
Guo et al.

(10) Patent No.: US 10,851,233 B2
(45) Date of Patent: Dec. 1, 2020

(54) ACRYLIC COMPOSITION

(71) Applicant: Rohm and Haas Company, Collegeville, PA (US)

(72) Inventors: Hailan Guo, Warrington, PA (US); Carlos A. Cruz, Collegeville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 288 days.

(21) Appl. No.: 15/776,159

(22) PCT Filed: Dec. 13, 2016

(86) PCT No.: PCT/US2016/066263
§ 371 (c)(1),
(2) Date: May 15, 2018

(87) PCT Pub. No.: WO2017/106128
PCT Pub. Date: Jun. 22, 2017

(65) Prior Publication Data
US 2020/0255648 A1  Aug. 13, 2020

Related U.S. Application Data

(60) Provisional application No. 62/269,126, filed on Dec. 18, 2015.

(51) Int. Cl.
| | | |
|---|---|---|
| *C08L 33/12* | (2006.01) | |
| *C08K 5/11* | (2006.01) | |
| *C08J 5/18* | (2006.01) | |
| *C08L 33/08* | (2006.01) | |
| *C08L 47/00* | (2006.01) | |
| *C08L 51/00* | (2006.01) | |
| *C08K 5/00* | (2006.01) | |
| *C08K 5/12* | (2006.01) | |
| *C08L 71/02* | (2006.01) | |

(52) U.S. Cl.
CPC .............. *C08L 33/12* (2013.01); *C08J 5/18* (2013.01); *C08K 5/11* (2013.01); *C08L 33/08* (2013.01); *C08L 47/00* (2013.01); *C08L 51/003* (2013.01); *C08J 2333/08* (2013.01); *C08J 2333/12* (2013.01); *C08K 5/0016* (2013.01); *C08K 5/12* (2013.01); *C08L 71/02* (2013.01); *C08L 2203/16* (2013.01); *C08L 2205/02* (2013.01); *C08L 2205/025* (2013.01); *C08L 2205/03* (2013.01)

(58) Field of Classification Search
CPC ...... C08J 5/18; C08J 2333/08; C08J 2333/12; C08K 5/06; C08K 5/09; C08K 5/10; C08K 5/101; C08K 5/11; C08K 5/12; C08K 5/0016; C08L 33/00; C08L 33/02; C08L 33/04; C08L 33/08; C08L 33/12; C08L 47/00; C08L 51/003; C08L 71/02; C08L 2203/16; C08L 2205/03
See application file for complete search history.

(56) References Cited

U.S. PATENT DOCUMENTS

| | | | |
|---|---|---|---|
| 2006/0045990 A1* | 3/2006 | Kim | ............... G02F 1/133528 428/1.1 |
| 2006/0135665 A1 | 6/2006 | Hansel et al. | |
| 2008/0139737 A1* | 6/2008 | Alderfer | .............. C09D 133/18 524/521 |
| 2008/0274357 A1 | 11/2008 | Kasai et al. | |
| 2009/0281220 A1* | 11/2009 | Fenyvesi | ................ C08K 5/103 524/317 |
| 2010/0175737 A1 | 7/2010 | Guo et al. | |
| 2015/0175774 A1* | 6/2015 | Aoyagi | ................... C08K 5/10 524/308 |
| 2015/0183944 A1 | 7/2015 | Guo et al. | |

FOREIGN PATENT DOCUMENTS

| | | | |
|---|---|---|---|
| EP | 0181710 A2 | 5/1986 | |
| JP | 2002-293838 A | 10/2002 | |
| JP | 2004331866 A | * 11/2004 | |
| JP | 2012246365 A | * 12/2012 | |

OTHER PUBLICATIONS

JP2004331866 English Machine Translation, prepared May 21, 2020. (Year: 2020).*
JP2012246365 English Machine Translation, prepared May 26, 2020. (Year: 2020).*

* cited by examiner

*Primary Examiner* — Christopher M Rodd
(74) *Attorney, Agent, or Firm* — Brian L. Mutschler

(57) ABSTRACT

Provided is a polymer composition comprising an acrylic resin and a compound (I)

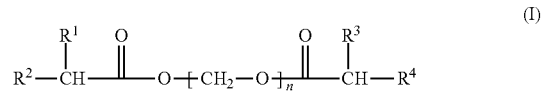

(I)

wherein $R^1$, $R^2$, $R^3$, and $R^4$ is each independently hydrogen or an organic group having 1 or more carbon atoms, and n is from 1 to 20.

7 Claims, No Drawings

ACRYLIC COMPOSITION

It is often desirable to provide a flexible plastic article. It is desirable that such an article have good resistance to ultraviolet (UV) radiation and other stresses due to weather so that the article may be used outdoors. Acrylic plastics have the necessary UV resistance and weather resistance, but many acrylic plastics are not sufficiently flexible and/or have surface hardness that is too high.

US 2008/0274357 describes a resin composition comprising an acrylic polymer and a plasticizer. US 2008/0274357 discusses plasticizers of the following types: phthalate, phosphate, adipic ester, ether, polyester, soybean oil, and propylene glycol. In the course of discovering the present invention, it has been found that such plasticizers, when mixed with an acrylic polymer, often have one or more of the following drawbacks: they have low plasticizing power; they cause haze in the acrylic polymer; or they migrate out of the acrylic polymer. It is desired to provide a composition that contains acrylic polymer that has one or more of the following benefits: the composition has flexibility; the composition has a desirably low modulus; the composition is not hazy; the additive has desirably high plasticizing power; and/or the additive resists migrating out of the composition.

The following is a statement of the invention.

A first aspect of the present invention is a polymer composition comprising an acrylic resin and a compound (I)

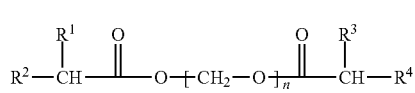

(I)

wherein $R^1$, $R^2$, $R^3$, and $R^4$ is each independently hydrogen or an organic group having 1 or more carbon atoms, and n is from 1 to 20.

The following is a detailed description of the invention.

As used herein, the following terms have the designated definitions, unless the context clearly indicates otherwise.

A "polymer," as used herein is a relatively large molecule made up of the reaction products of smaller chemical repeat units. Polymers may have structures that are linear, branched, star shaped, looped, hyperbranched, crosslinked, or a combination thereof. Polymers having a single type of repeat unit are called homopolymers, and polymers that have more than one type of repeat unit are called copolymers. Polymers have weight-average molecular weight of 1,000 or more. Weight-average molecular weight is assessed using size exclusion chromatography using polystyrene standards.

Molecules that can react with each other to form the repeat units of a polymer are known herein as "monomers." The repeat units so formed are known herein as "polymerized units" of the monomer.

Vinyl monomers have the structure

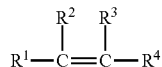

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof.

Some suitable vinyl monomers include, for example, styrene, substituted styrenes, dienes, ethylene, other alkenes, dienes, ethylene derivatives, and mixtures thereof. Ethylene derivatives include, for example, unsubstituted or substituted versions of the following: ethenyl esters of substituted or unsubstituted alkanoic acids (including, for example, vinyl acetate and vinyl neodecanoate), acrylonitrile, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof. In some embodiments, substituted monomers include, for example, monomers with more than one carbon-carbon double bond, monomers with hydroxyl groups, monomers with other functional groups, and monomers with combinations of functional groups.

As used herein, acrylic monomers are monomers selected from (meth)acrylic acid, alkyl esters of (meth)acrylic acid, alkyl esters of (meth)acrylic acid having one or more substituent on the alkyl group, (meth)acrylamide, N-substituted (meth)acrylamides, and mixtures thereof. As used herein, vinyl aromatic monomers are vinyl monomers that contain one or more aromatic ring. Suitable vinyl aromatic monomers include, for example, styrene and substituted styrenes.

As used herein the phrase "alkyl" group means an unsubstituted alkyl group unless the context specifically states that a substituent is present.

One class of vinyl monomers is multivinyl monomers, which are monomers having two or more polymerizable carbon-carbon double bonds. Examples of multiethylenically unsaturated monomers are divinyl benzene, allyl (meth)acrylate, and multiacrylate esters of alkylene polyols. An alkylene polyol is a compound that has the structure that would be formed from an alkane if two or more hydrogen atoms were replaced with hydroxyl groups. A multiacrylate ester of an alkylene polyol is a compound that has the structure that would be formed if two or more of the hydroxyl groups on the polyol each reacted with acrylic acid or methacrylic acid to form an ester linkage.

A vinyl monomer containing exactly one polymerizable carbon-carbon double bond is a monovinyl monomer.

A polymer made by aqueous emulsion polymerization is known herein as a "latex" polymer. Latex polymers exist as particles distributed throughout an aqueous medium.

As used herein, a vinyl polymer is a polymer in which 90% or more or the polymerized units are vinyl monomers. As used herein, an "acrylic" polymer (also called herein "acrylic resin") is a polymer in which 30% or more of the polymerized units are selected from acrylic monomers and also in which 75% or more of the polymerized units are selected from the group consisting of acrylic monomers and vinylaromatic monomers. The percentages are by weight based on the weight of the polymer. The term "acrylic resin" is used herein to mean either a single acrylic polymer or a mixture of two or more polymers, where every polymer in the mixture qualifies as an acrylic polymer.

Glass transition temperature (Tg) is characterized by differential scanning calorimetry (DSC) at 20° C. per minute, using the inflection point method. A monomer is said herein to have a certain Tg if a homopolymer made from that monomer has that Tg.

A multi-stage polymer is a polymer made by two or more separate polymerization processes, where the second polymerization process is made in the presence of the polymer that was made in the first polymerization process, and any successive polymerization process, if performed, is carried out in the presence of the polymers that were made in the previous polymerization processes. Each one of these separate polymerization processes produces a polymer known herein as a "stage."

The phrase "plasticizing power" refers to the ability of a compound to reduce the Tg and/or the hardness of a resin when that compound is added to the resin. The stronger the plasticizing power, the greater the reduction in Tg and/or hardness at a given PHR of the added compound.

ASTM refers to testing standards published by ASTM International, West Conshohocken Pa., USA.

A film is an object that has size in its smallest dimension of 1 mm or less and that has size in the two dimensions perpendicular to the direction of the smallest dimension of 5 cm or more.

The composition of the present invention contains compound (I), which has the following structure:

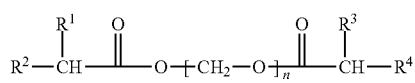

I where $R^1$, $R^2$, $R^3$, and $R^4$ is each independently hydrogen or an organic group having 1 or more carbon atom, and where n is 1 to 20.

Preferably, one or more of $R^1$, $R^2$, $R^3$, and $R^4$ is a hydrocarbon group having 1 to 20 carbon atoms. Preferably, $R^1$ is an alkyl group having 18 or fewer carbon atoms; more preferably 8 or fewer carbon atoms; more preferably 6 or fewer carbon atoms; more preferably 4 or fewer carbon atoms; more preferably 2 or fewer carbon atoms. Preferably, $R^1$ is an alkyl group having 1 or more carbon atoms; more preferably 2 or more carbon atoms. $R^1$ and $R^3$ may be the same as each other or different from each other. The preferences for the structure of $R^3$ are the same as those described above for $R^1$. Preferably, $R^3$ has the same composition as $R^1$.

Preferably, $R^2$ is an alkyl group having 18 or fewer carbon atoms; more preferably 8 or fewer carbon atoms; more preferably 6 or fewer carbon atoms; more preferably 4 or fewer carbon atoms. Preferably, $R^2$ is an alkyl group having 2 or more carbon atoms; more preferably 3 or more carbon atoms; more preferably 4 or more carbon atoms. $R^2$ and $R^4$ may be the same as each other or different from each other. The preferences for the structure of $R^4$ are the same as those described above for $R^2$. Preferably, $R^4$ has the same composition as $R^2$.

Preferably, n is 15 or fewer; more preferably 10 or fewer; more preferably 5 or fewer; more preferably 3 or fewer. Preferably, n is 2 or more; more preferably 3 or more.

The composition of the present invention contains one or more acrylic resin. Preferably, the acrylic resin contains polymerized units of one or more unsubstituted alkyl ester of (meth)acrylic acid. Preferably, the amount of polymerized units of one or more unsubstituted alkyl ester of (meth)acrylic acid in the acrylic resin is, by weight based on the weight of the acrylic resin, 50% or more; more preferably 75% or more; more preferably 85% or more; more preferably 90% or more.

Preferably, the acrylic resin contains one or more polymer (a) as defined below, one or more polymer (b) as defined below, one or more polymer (c) as defined below, or a combination of two or more of polymer (a), polymer (b), and polymer (c).

Preferably, the acrylic resin contains one or more polymer (a). Polymer (a) is an acrylic polymer. Polymer (a) has Tg of −85° C. to −10° C., and polymer (a) contains 0.1% to 5% by weight, based on the weight of polymer (a), of polymerized units of multivinyl monomer. Polymer (a) also contains polymerized units of monovinyl monomer. Preferably, polymer (a) contains polymerized units of one or more monovinyl monomer that has Tg of −20° C. or less. Preferably, the amount of polymerized units of monovinyl monomer having Tg of −20° C. or less is 50% or more; more preferably 70% or more; more preferably 85% or more; more preferably 90% or more. Preferred monovinyl monomers are alkyl esters of (meth)acrylic acid in which the alkyl group is substituted or unsubstituted; among such monomers, preferably the number of carbon atoms is 12 or fewer; more preferably 8 or fewer; more preferably 6 or fewer. More preferred are alkyl esters of (meth)acrylic acid in which the alkyl group is unsubstituted. More preferred are alkyl esters of acrylic acid; more preferred is butyl acrylate.

In polymer (a), preferably the amount of polymerized units of monovinyl alkyl esters of (meth)acrylic acid in which the alkyl group is unsubstituted is, by weight based on the weight of polymer (a), 50% or more; more preferably 70% or more; more preferably 85% or more; more preferably 90% or more.

Polymer (a) contains polymerized units of multivinyl monomer. Preferred multivinyl monomers are allyl (meth)acrylate and multiacrylate esters of alkylene polyols. Among multiacrylate esters of alkylene polyols, preferred are diesters of acrylic acid with alkyl diols. Preferred alkyl diols have 12 or fewer carbon atoms; more preferably 8 or fewer carbon atoms; more preferably 6 or fewer carbon atoms. Preferred alkyl diols have 2 or more carbon atoms; more preferably 3 or more carbon atoms. Between allyl acrylate and allyl methacrylate, preferred is allyl methacrylate. Preferred is a mixture of allyl methacrylate and one or more multiacrylate esters of alkylene polyols.

Preferably the amount of polymerized units of multivinyl monomer in polymer (a) is, by weight based on the weight of polymer (a), 0.1% or more; more preferably 0.2% or more; more preferably 0.5% or more. Preferably the amount of polymerized units of multivinyl monomer in polymer (a) is, by weight based on the weight of polymer (a), 5% or less; more preferably 4% or less; more preferably 3% or less.

Preferably, the Tg of polymer (a) is −60° C. or higher; more preferably −55° C. or higher; more preferably −50° C. or higher. Preferably the Tg of polymer (a) is −25° C. or lower; more preferably −30° C. or lower; more preferably −35° C. or lower.

Preferably, the acrylic resin additionally comprises polymer (b). Polymer (b) has Tg that is 20° C. or more higher than the Tg of polymer (a). Polymer (b) has Tg between −30° C. and 70° C. Polymer (b) is an acrylic polymer.

Preferably, polymer (b) contains polymerized units of one or more alkyl esters of acrylic acid in which the alkyl group is unsubstituted in an amount, by weight based on the weight of polymer (b), of 10% or more; more preferably 20% or more; more preferably 30% or more; more preferably 40% or more. Preferably, polymer (b) contains polymerized units of one or more alkyl esters of acrylic acid in which the alkyl group is unsubstituted in an amount, by weight based on the weight of polymer (b), of 95% or less; more preferably 90% or less; more preferably 80% or less. Preferably, polymer (b) contains polymerized units of one or more alkyl esters of methacrylic acid in which the alkyl group is unsubstituted in an amount, by weight based on the weight of polymer (b), of 5% or more; more preferably 10% or more; more preferably 20% or more. Preferably, polymer (b) contains polymerized units of one or more alkyl esters of methacrylic acid in which the alkyl group is unsubstituted in an amount, by weight based on the weight of polymer (b), of 90% or less; more preferably 80% or less; more preferably 70% or less; more preferably 60% or less.

Preferably, polymer (b) contains polymerized units of one or more multivinyl monomer. Preferred multivinyl monomers are allyl (meth)acrylate and multiacrylate esters of alkylene polyols; more preferred is allyl methacrylate. Preferably the amount of polymerized units of multivinyl monomers is, by weight based on the weight of polymer (b), 0.1% or more; more preferably 0.2% or more; more preferably 0.3% or more. Preferably the amount of polymerized units of multivinyl monomers is, by weight based on the weight of polymer (b), 5% or less; more preferably 2% or less; more preferably 1% or less.

In polymer (b), preferably the amount of polymerized units of monovinyl alkyl esters of (meth)acrylic acid in which the alkyl group is unsubstituted is, by weight based on the weight of polymer (b), 50% or more; more preferably 70% or more; more preferably 85% or more; more preferably 90% or more.

The Tg of polymer (b) is preferably −30° C. or higher; more preferably −20° C. or higher. The Tg of polymer (b) is preferably 40° C. or lower; more preferably 30° C. or lower; more preferably 20° C. or lower; more preferably 10° C. or lower.

Preferably, the acrylic resin additionally comprises polymer (c). Polymer (c) has Tg that is 40° C. or more higher than the Tg of polymer (b). Polymer (b) has Tg between 40° C. and 110° C. Polymer (c) is an acrylic polymer.

Preferably, polymer (c) contains polymerized units of one or more alkyl esters of acrylic acid in which the alkyl group is unsubstituted in an amount, by weight based on the weight of polymer (c), of 0% or more; more preferably 1% or more; more preferably 1% or more; more preferably 3% or more. Preferably, polymer (c) contains polymerized units of one or more alkyl esters of acrylic acid in which the alkyl group is unsubstituted in an amount, by weight based on the weight of polymer (c), of 20% or less; more preferably 15% or less; more preferably 10% or less. Preferably, polymer (c) contains polymerized units of one or more alkyl esters of methacrylic acid in which the alkyl group is unsubstituted in an amount, by weight based on the weight of polymer (c), of 80% or more; more preferably 85% or more; more preferably 90% or more. Preferably, polymer (c) contains polymerized units of one or more alkyl esters of methacrylic acid in which the alkyl group is unsubstituted in an amount, by weight based on the weight of polymer (c), of 100% or less; more preferably 99% or less; more preferably 98% or less.

Preferably, the total amount of polymerized units of multivinyl monomer in polymer (c) is, by weight based on the weight of polymer (c), 0% to 0.05%; more preferably 0% to 0.01%; more preferably zero.

Preferably, the weight-average molecular weight of polymer (c) is 250,000 or less; more preferably 100,000 or less; more preferably 80,000 or less; more preferably 60,000 or less. Preferably, the weight-average molecular weight of polymer (c) is 5,000 or more; more preferably 10,000 or more; more preferably 20,000 or more.

Preferably, polymer (c) is made in the presence of one or more chain transfer agents. Preferred chain transfer agents are alkyl mercaptans in which the alkyl group has 4 to 18 carbon atoms. Preferably, one or more of the polymer chains of polymer (c) have attached one or more residues of a chain transfer agent.

Preferably, polymer (c) has Tg of 60° C. or higher; more preferably 70° C. or higher; more preferably 80° C. or higher; more preferably 90° C. or higher. Preferably, polymer (c) has Tg of 120° C. or lower.

Preferably, the amount of polymer (a), by weight based on the weight of the acrylic resin, is 5% or more; more preferably 10% or more; more preferably 20% or more. Preferably, the amount of polymer (a), by weight based on the weight of the acrylic resin, is 70% or less; more preferably 60% or less; more preferably 50% or less.

Preferably, the amount of polymer (b), by weight based on the weight of the acrylic resin, is 5% or more; more preferably 10% or more; more preferably 20% or more. Preferably, the amount of polymer (b), by weight based on the weight of the acrylic resin, is 70% or less; more preferably 60% or less; more preferably 50% or less.

Preferably, the amount of polymer (c), by weight based on the weight of the acrylic resin, is 10% or more; more preferably 15% or more; more preferably 25% or more. Preferably, the amount of polymer (c), by weight based on the weight of the acrylic resin, is 80% or less; more preferably 70% or less; more preferably 60% or less.

Preferably, each of polymer (a), polymer (b), and polymer (c) is either a homopolymer or is a statistical copolymer of the monomers used in making it. In some embodiments, one or more of the polymer chains of polymer (a) may be grafted to one or more of the polymer chains of polymer (b), or one or more of the polymer chains of polymer (a) may be grafted to one or more of the polymer chains of polymer (c), or one or more of the polymer chains of polymer (b) may be grafted to one or more of the polymer chains of polymer (c), or any combination thereof. Whether or not any such grafting has occurred, it is considered herein that the preferred compositions and amounts of polymer (a), polymer (b), and polymer (c) are as described above. For example, a first hypothetical embodiment may be considered in which an acrylic resin has 30% by weight polymer (a), 30% by weight polymer (b), and 40% by weight polymer (c), and there was no grafting among the polymer chains of different composition. A second hypothetical embodiment may be considered that is identical to the first hypothetical embodiment except that half of the polymer chains of polymer (b) are grafted to polymer chains of polymer (a). In the second hypothetical embodiment, it is considered that polymer (a) has the same composition as polymer (a) in the first hypothetical embodiment, that polymer (b) has the same composition as polymer (b) in the first hypothetical embodiment, that polymer (c) has the same composition as polymer (c) in the first hypothetical embodiment, and that the acrylic resin in the second hypothetical embodiment has 30% by weight polymer (a), 30% by weight polymer (b), and 40% by weight polymer (c), as in the first hypothetical embodiment.

In some embodiments, two or more of polymer (a), polymer (b), and polymer (c) mix so intimately that a DSC experiment is unable to distinguish the individual glass transitions of the mixed polymers. However, herein the Tg of a polymer is considered to be an intrinsic property of each individual polymer. For example, a hypothetical embodiment could be considered in which polymer (b), when measured in an un-mixed state, had Tg of 0° C., and polymer (c), when measured in an un-mixed state, had Tg of 90° C.

In this hypothetical embodiment, if polymer (b) and polymer (c) were so thoroughly mixed that a DSC test could not distinguish their individual glass transitions, it would still be said herein that the acrylic polymer contained a polymer having Tg of 0° C. and contained a polymer having Tg of 90° C.

The amount of an ingredient may be characterized by PHR, which is the amount of that ingredient by weight per 100 parts by weight of acrylic resin.

Preferably, the amount of compound (I) is 1 PHR or more; more preferably 2 PHR or more; more preferably 5 PHR or more; more preferably 10 PHR or more. Preferably, the amount of compound (I) is 50 PHR or less; more preferably 40 PHR or less; more preferably 30 PHR or less.

Preferably, the total amount in the composition of the present invention of all compounds that have one or more phthalate groups is 0 to 1 PHR; more preferably 0 to 0.1 PHR; more preferably zero. Preferably, the total amount in the composition of the present invention of all compounds having one or more phosphate groups or one or more phosphate ions is 0 to 1 PHR; more preferably 0 to 0.1 PHR; more preferably zero. Preferably, the total amount in the composition of the present invention of all compounds selected from the group consisting of oils extracted from plants (such as, for example, soybean oil), derivatives of oils extracted from plants (such as, for example, epoxidized oils), and mixtures thereof, is 0 to 1 PHR; more preferably 0 to 0.1 PHR; more preferably zero.

Preferably, the total amount in the composition of the present invention of all compounds that have one or more ester linkages and that do not qualify as either compound (I) or acrylic resin is 0 to 1 PHR; more preferably 0 to 0.1 PHR; more preferably zero. Preferably, the total amount in the composition of the present invention of all compounds that have one or more ether linkages and that do not qualify as either compound (I) or acrylic resin is 0 to 1 PHR; more preferably 0 to 0.1 PHR; more preferably zero.

The composition of the present invention may be made by any method. Preferably, the acrylic resin is supplied as powder or pellets; the acrylic resin is brought into contact with compound (I), and the mixture is exposed to temperature that is 30° C. or more above the highest Tg of any polymer in the acrylic resin. Preferably, the acrylic resin is supplied as powder or pellets having water content, by weight based on the weight of the acrylic resin, of 10% or less; more preferably 5% or less. Preferably, the acrylic resin is supplied as powder, i.e., as a collection of particles having weight-average diameter of 2 mm or less; more preferably 1 mm or less.

Acrylic resin in powder form may be made by any method. Preferably, acrylic resin is made by a process of aqueous emulsion polymerization to produce acrylic resin in latex form, followed by a process of removing water from the latex to produce a powder.

In a preferred process of emulsion polymerization, in a first stage, polymer (a) is produced by aqueous emulsion polymerization of one or more monomers to produce latex particles of polymer (a) in water. Then, in a intermediate stage, in the presence of the latex particles of polymer (a), polymer (b) is produced by aqueous emulsion polymerization of one or more monomers to produce latex particles in water, where the typical latex particle contains a core of polymer (a) and layer of polymer (b) disposed on the surface of the particle. Then, in a final stage, in the presence of the latex particles formed in the intermediate stage, polymer (c) is produced by aqueous emulsion polymerization of one or more monomers to produce latex particles in water, where the typical latex particle comprises a core of polymer (a), an intermediate layer of polymer (b) disposed on the surface of the core, and an outermost layer of polymer (c).

In some embodiments, one or more additional stages of polymerization may be performed prior to the first stage; or after the first stage and before the intermediate stage described above; or after the intermediate stage described above and before the final stage; or in any combination thereof.

Preferably, the latex particles of the acrylic resin have volume-average diameter, as measured by light scattering, of 400 nm or less; more preferably 350 nm or less; more preferably 300 nm or less; more preferably 250 nm or less.

Preferred methods of removing water from a latex are spray drying and coagulation. In a coagulation method, a compound (such as an inorganic salt) is added to render the latex unstable, causing the latex particles to coagulate. Typically, the coagulated latex particles are subjected to one or more additional operations to remove water, such as pressing, suction, fluid bed drying, or a combination thereof.

After the acrylic resin has been brought into contact with compound (I) to form a mixture, the mixture is preferably heated to a temperature of 140° C. or higher; more preferably 150° C. or higher; more preferably 160° C. or higher. Preferably, while the temperature is at 140° C. or higher, the mixture is also subjected to mechanical shear forces, such as, for example, by calendering, plasticating, extruding, or a combination thereof.

A preferred form of the composition of the present invention is a film. Film may be made by any method. Suitable methods of making film include but are not limited to, for example, compression molding and extrusion.

The following are examples of the present invention.

Compound (I) or a liquid plasticizer was incorporated into acrylic resin powder by blending as follows. Compound (I) or the liquid plasticizer was slowly dropped into the acrylic powder, while a spatula was used to mix the liquid and powder mixture by hand. The liquid was absorbed by the acrylic powder afterwards, and the mixture became a free flowing powder.

Films were produced in a 2-roll mill as follows. The powder blends produced as described above were processed using a Collin Mill (W. H. Collin GmbH Maschienefabrik, Aichach, Germany) at 170° C. for 5 minutes. After the milling was completed, the molten polymer was slowly peeled from the metal rolls to obtain a thin film with a thickness about 200 μm. These films were used directly for tensile testing.

Molded samples were produced as follows. The milled film samples produced as described above were placed in a metal mold and compression molded into sheets with a thickness in the range from 635 to 762 μm (25 to 30 mil). A Carver™ press (Carver Press Inc., Menomonee Falls, Wis.) was used with an operating temperature of 170° C. and pressing conditions of 2304 kgf (2.268 tons) for 3 minutes, followed by 9216 kgf (9.07 tons) for 2 minutes, and a 5-minute cooling period (at 23° C., room temperature) at 9216 kgf (9.07 tons).

Dynamic scanning calorimetry (DSC) measurements were performed as follows. The molded sheet samples were run on a TA Instruments model Q2000 DSC in hermetically sealed Tzero™ aluminum pans, with holes in the lids. They were run as follows:

Equilibrated at −150.00° C.
Isothermal for 2.00 min
Ramped 20.00° C./min to 150.00° C.
Equilibrated at −150.00° C.
Isothermal for 2.00 min
Ramped 20.00° C./min to 150.00° C.

The hardness of the molded samples was tested using ASTM method D2240, indentation of plastic by a Durometer. The tensile properties of milled samples was tested according to ASTM D882. The glass transition temperature (Tg) was measured by DSC at 20° C. using the inflection point method.

Migration of additives was tested as follows.

For the room temperature migration test, the test samples were cut into 2.54 cm×15.24 cm (1 in×6 in) strips, then the two ends of the film strip were taped together to form a circular loop. The loops were placed at room temperature (approximately 23° C.) for 2 months, and visual inspections of the film loops were conducted every week. When additive migrated out of the film strip, the additive was visible.

For the 60° C. migration test, film strips were clamped on a rack and placed in an air circulated oven. After 7 days, the film samples were taken out of the oven, and visual inspections of the film for migration were recorded.

Materials used were as follows:
C1=compound (I)=WVC380 from Celanese Corporation, has structure I as above, with n=3; $R^1=R^3$=ethyl, and $R^2=R^4$=n-butyl.
DINP=di-isononyl phthalate
Wax4=Carbowax™ 400 polyethylene glycol, having average molecular weight of 380 to 420, from The Dow Chemical Company.
Wax10=Carbowax™ 1000 polyethylene glycol, having average molecular weight of 950 to 1050, from The Dow Chemical Company.
BA=butyl acrylate
MMA=methyl methacrylate Three acrylic resins were used, Resin-1, Resin-2, and Resin-3. All three were made by emulsion polymerization in three stages, having polymer (a) first stage, polymer (b) second stage, and polymer (c) third stage. In the latex form, all three resins had volume-average particle size of less than 250 nm. Water was removed from the latex form of each resin to produce a dry powder having less than 10% water by weight based on the weight of the powder.

In all three resins, polymer (a) was a copolymer of BA and one or more multivinyl monomers. The amount of multivinyl monomer was between 0.5% and 5%, by weight based on the weight of all monomers. The Tg was between −50° C. and −35° C.

In all three resins, polymer (b) was a copolymer of BA, MMA, and one or more multivinyl monomers. The amount of multivinyl monomer was between 0.5% and 3%, by weight based on the weight of all monomers.

In all three resins, polymer (c) was a copolymer of BA and MMA. The Tg was between 85° C. and 110° C. In all three resins, polymer (c) was made in the presence of a chain transfer agent, in an amount between 0.5% and 2% by weight based on the sum of the weights of BA and MMA.

Resin-1 had weight ratio of the three stages, in order of polymerization, of polymer (a)//polymer (b)//polymer (c)=25//25//50. In Resin-1, the Tg of polymer (b) was between 10° C. and 30° C.

Resin-2 had weight ratio of the three stages, in order of polymerization, of polymer (a)//polymer (b)//polymer (c)=35//35//30. In Resin-2, the Tg of polymer (b) was between −20° C. and 10° C.

Resin-3 was similar to Resin-2

Results of the tests were as follows. "Ex" means example. Example numbers ending in "C" are comparative examples.

EXAMPLE 1: TENSILE TESTING

Results of the tensile tests were as follows.

| Ex | Resin | additive | Thick[1] | Elong[2] | Stress[3] | Modulus[4] |
|---|---|---|---|---|---|---|
| 1-1C | Resin-2 | none | 203 (8) | 250 | 0.164 (2380) | 1.81 (26300) |
| 1-2 | Resin-2 | 10 phr C1 | 203 (8) | 330 | 0.097 (1400) | 1.08 (15650) |
| 1-3C | Resin-3 | none | 203 (8) | 202 | 0.127 (1840) | 1.43 (20800) |
| 1-4 | Resin-3 | 10 phr C1 | 229 (9) | 280 | 0.066 (950) | 0.66 (9540) |

Note[1]:
Thickness in μm (mil)
Note[2]:
Elongation at break, in %
Note[3]:
Stress at break, in MPa (psi)
Note[4]:
Tensile modulus, in MPa (psi)

Adding C1 to the resin causes only small reductions in tensile strength and modulus, while improving the elongation.

EXAMPLE 3: MECHANICAL PROPERTIES AT 23° C.

Mechanical properties were tested as described above. The symbol "--" means that no test was performed. Results were as follows.

| Ex. | Resin type | Additive type | Additive PHR | Tg (° C.) | Hardness Shore D | Modulus (MPa (kpsi)) |
|---|---|---|---|---|---|---|
| 2-1 | Resin-1 | C1 | 10 | −58 | 51 | 197 (28.6) |
| 2-2 | Resin-1 | C1 | 20 | −68 | 47 | 111 (16.1) |
| 2-3 | Resin-1 | C1 | 30 | −76 | 44 | 80 (11.6) |
| 2-4C | Resin-1 | DINP | 10 | −52 | 62 | 153 (22.6) |
| 2-5C | Resin-1 | DINP | 20 | −65 | 51 | 151 (21.9) |
| 2-6C | Resin-1 | DINP | 30 | −66 | 45 | 141 (20.5) |

In the above table, it is clear that C1 is more effective than DINP at lowering the Tg and the hardness of Resin-1 at all PHR levels. For example, 20 PHR of gave Shore D hardness of 51, while the same amount of C1 in the same resin gave a lower hardness of 47. Also, at 20 and 30 PHR, C1 is more effective than DINP at lowering the modulus.

| Ex. | Resin type | Additive type | Additive PHR | Tg (° C.) | Hardness Shore A | Modulus (MPa (kpsi)) |
|---|---|---|---|---|---|---|
| 2-7 | Resin-2 | C1 | 10 | −41 | 89 | 51.8 (7.52) |
| 2-8 | Resin-2 | C1 | 20 | −54 | 75 | 34.3 (4.98) |
| 2-9 | Resin-2 | C1 | 30 | −63 | 67 | 23.4 (3.39) |
| 2-10C | Resin-2 | DINP | 10 | −49 | 90 | 64.0 (9.28) |
| 2-11C | Resin-2 | DINP | 20 | −50 | 86 | 54.1 (7.84) |
| 2-12C | Resin-2 | DINP | 30 | −55 | 80 | 39.2 (5.69) |

In the above table, it is clear that C1 is more effective than DINP at lowering the Tg, the hardness, and the modulus of Resin-2 at all PHR levels.

EXAMPLE 3: MIGRATION RESULTS

Migration tests were performed as described above, using Resin-1. Appearance was observed as either transparent ("trans") or hazy. The symbol "--" means that no test was performed. Results were as follows:

| Ex. | Resin type | Additive type | Additive PHR | appearance | 23° C. migration | 60° C. migration |
|---|---|---|---|---|---|---|
| 3-1 | Resin-1 | C1 | 10 | trans | no | no |
| 3-2 | Resin-1 | C1 | 20 | trans | no | no |
| 3-3 | Resin-1 | C1 | 30 | trans | no | no |
| 3-4C | Resin-1 | DINP | 10 | trans | no | no |
| 3-5C | Resin-1 | DINP | 20 | trans | no | no |
| 3-6C | Resin-1 | DINP | 30 | trans | no | no |

| Ex. | Resin type | Additive type | Additive PHR | appearance | 23° C. migration | 60° C. migration |
|---|---|---|---|---|---|---|
| 3-7C | Resin-1 | Wax4 | 5 | trans | no | — |
| 3-8C | Resin-1 | Wax4 | 10 | trans | yes | yes |
| 3-9 | Resin-1 | Wax4 | 20 | hazy | yes | yes |
| 3-10C | Resin-1 | Wax4 | 30 | hazy | yes | yes |
| 3-11C | Resin-1 | Wax10 | 5 | trans | no | — |
| 3-12C | Resin-1 | Wax10 | 10 | trans | yes | yes |
| 3-13C | Resin-1 | Wax10 | 20 | hazy | | yes |
| 3-14C | Resin-1 | Wax10 | 30 | hazy | | yes |

The results in the tables above show that in Resin-1, Wax4 and Wax10, unlike C1, have the undesirable tendency to cause hazy appearance and to migrate out of the film, especially when used at higher levels of PHR.

| Ex. | Resin type | Additive type | Additive PHR | appearance | 23° C. migration | 60° C. migration |
|---|---|---|---|---|---|---|
| 3-15 | Resin-2 | C1 | 10 | trans | no | no |
| 3-16 | Resin-2 | C1 | 20 | trans | no | no |
| 3-17 | Resin-2 | C1 | 30 | trans | no | no |
| 3-18C | Resin-2 | DINP | 10 | trans | no | no |
| 3-19 | Resin-2 | DINP | 20 | trans | no | no |
| 3-20C | Resin-2 | DINP | 30 | trans | no | no |

| Ex. | Resin type | Additive type | Additive PHR | appearance | 23° C. migration | 60° C. migration |
|---|---|---|---|---|---|---|
| 3-21C | Resin-2 | Wax4 | 5 | trans | no | — |
| 3-22C | Resin-2 | Wax4 | 10 | trans | yes | yes |
| 3-23C | Resin-2 | Wax4 | 20 | hazy | yes | yes |
| 3-24C | Resin-2 | Wax4 | 30 | hazy | yes | yes |
| 3-25C | Resin-2 | Wax10 | 5 | trans | no | — |
| 3-26C | Resin-2 | Wax10 | 10 | trans | yes | yes |
| 3-27C | Resin-2 | Wax10 | 20 | hazy | no | yes |
| 3-28C | Resin-2 | Wax10 | 30 | hazy | no | yes |

The results in the tables above show that in Resin-2, Wax4 and Wax10, unlike C1, have the undesirable tendency to cause hazy appearance and to migrate out of the film, especially when used at higher levels of PHR.

EXAMPLE 4: RETENTION OF TENSILE PROPERTIES AFTER HEAT AGING

Samples were stored at 60° C. for 7 days and then tested at 23° C. Reported quantities are the following:

El. Ret.=elongation retention=(elongation after storage)/(initial elongation)

St. Ret.=Tensile strength retention=(tensile strength after storage)/(initial tensile strength)

The symbol ">" means "greater than."
Results were as follows:

| Ex. | Resin type | Additive type | Additive PHR | Elong. Ret. | Str. Ret. |
|---|---|---|---|---|---|
| 4-1 | Resin-1 | C1 | 10 | >100% | >94% |
| 4-2 | Resin-1 | C1 | 20 | >100% | >100% |
| 4-3 | Resin-1 | C1 | 30 | >100% | >95% |
| 4-4C | Resin-1 | DINP | 10 | >90% | >95% |
| 4-5C | Resin-1 | DINP | 20 | >100% | >100% |
| 4-6C | Resin-1 | DINP | 30 | >100% | >85% |

| Ex. | Resin type | Additive type | Additive PHR | Elong. Ret. | Str. Ret. |
|---|---|---|---|---|---|
| 4-7C | Resin-1 | Wax4 | 10 | >98% | >100% |
| 4-8C | Resin-1 | Wax4 | 20 | >96% | >100% |
| 4-9C | Resin-1 | Wax4 | 30 | >85% | >90% |
| 4-10C | Resin-1 | Wax10 | 10 | >80% | >100% |
| 4-11C | Resin-1 | Wax10 | 20 | >80% | >90% |
| 4-12C | Resin-1 | Wax10 | 30 | >85% | >95% |

The data in the two tables above show that C1 is as good as or better than the comparative additives at retaining elongation and strength after storage at 60° C.

The invention claimed is:

1. A polymer composition comprising an acrylic resin and a compound (I)

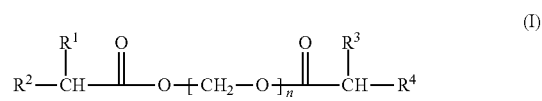

wherein $R^1$, $R^2$, $R^3$, and $R^4$ is each independently hydrogen or an organic group having 1 or more carbon atoms, and n is from 1 to 20.

2. The composition of claim 1, wherein $R^1$, $R^2$, $R^3$, and $R^4$ is each independently an alkyl group having 1 to 12 carbon atoms.

3. The composition of claim 1, wherein n is 2 to 5.

4. The composition of claim 1, wherein the acrylic resin is a multi-stage polymer composition comprising a polymer (a) that has glass transition temperature of from −85° C. to −10° C.

5. The composition of claim 1, wherein the acrylic resin is a multi-stage polymer composition comprising a polymer (a) that contains 0.1% to 5% by weight, based on the weight of polymer (a), polymerized units of one or more multivinyl monomer.

6. The composition of claim 1, wherein the composition is in the form of a film.

7. The composition of claim 1, wherein the compound (I) is present in an amount of 2 to 50 parts by weight per 100 parts by weight of the acrylic resin.

* * * * *